United States Patent Office 3,010,985
Patented Nov. 28, 1961

3,010,985
VINYLIC ALUMINUM COMPOUNDS AND
PROCESS OF PREPARING SAME
Hugh E. Ramsden, Scotch Plains, N.J., assignor to Metal
& Thermit Corporation, Woodbridge Township, N.J.,
a corporation of New Jersey
No Drawing. Filed July 12, 1957, Ser. No. 671,376
15 Claims. (Cl. 260—448)

The present invention relates to novel vinylicaluminum compounds and to a process for preparing the same. It has now been discovered that novel vinylic aluminum compounds can be prepared by a novel, efficient and economical process.

This application is a continuation-in-part of Serial No. 549,571, filed November 28, 1955 which in turn was a continuation-in-part of Serial No. 520,145, filed July 5, 1955, both now abandoned.

It is an object of the present invention to provide novel vinylic aluminum compounds.

It is also an object of this invention to provide a novel process for preparing vinylic aluminum compounds.

Generally speaking, the present invention embodies novel vinylic aluminum compounds having the general formula:

(1) $\qquad Vi_n R_a R'_b AlX_{3-(n+a+b)}$ wherein $n=1$, 2 or 3; $a$ and $b=0$ or 1; $n+a+b$ may not total more than 3; Vi is a vinylic radical; R and R' may be the same or different and are selected from the group consisting of alkyl, cycloalkyl, alkandiyl, cycloalkandiyl, alkenyl, alkadienyl, cycloalkenyl, alkynyl, cycloalkadienyl, aryl, aralkyl, and active-hydrogen-free heterocyclic radicals; and X is selected from the group consisting of iodine, bromine, chlorine and fluorine, alkoxy, and aryloxy radical. Two or more R groups may be cyclized. The aryl radicals include fused ring and condensed radicals. The term "vinylic radical" (Vi) is used herein to denote structures of the type:

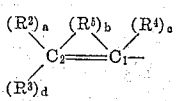

where the No. 1 carbon is bonded to aluminum and R", R''' and R'''' may be hydrogen and are further defined as is R above. The hydrocarbon radicals may be unsubstituted or carry functional groups inert to magnesium or vinylic magnesium chlorides under conditions. The vinylic radical also includes cycloalkenyls having the following general type structure:

(3) $\qquad HC{=}C{-}$
$\qquad\qquad\quad | \quad\;\; |$
$\qquad\quad H_2C{-}(CH_2)l$ where $l$ is a whole number greater than 1. By the term "active-hydrogen-free heterocyclic radical," all heterocyclic radicals except those containing hydrogen attached to nitrogen or oxygen, or containing other groups reactive with the organic magnesium chlorides, are included.

More specifically compounds encompassed by the present invention may be described by the general formula (3a) $\qquad Vi_n R_a R'_b AlX_{-(n+a+b)}$ wherein $n$ is a whole number from 1 to 3, $a$ and $b$ are whole numbers from 0 to 2, wherein the sum of $n+a+b$ does not exceed 3; X is selected from the class consisting of iodine, bromine, chlorine and fluorine, an alkoxy radical having up to 30 carbon atoms in the alkyl chain or an aryloxy radical having up to 3 rings in the aryl radical; R and R' are radicals selected from the class consisting of alkyl radicals having up to 30 carbon atoms in the alkyl chain, aryl radicals having up to 3 rings in the aryl radical and no more than 48 carbon atoms in the radical, cycloalkyl radicals having up to 8 carbon atoms in the cycloalkyl ring, heterocyclic radicals containing up to 3 rings in the radical and no more than 48 carbon atoms in the radical and containing as the heterocyclic atoms only elements selected from the class consisting of oxygen, sulfur and nitrogen; and divalent aliphatic hydrocarbon radicals wherein one valence of each is bonded to the aluminum atom and the remaining valence of each is joined to form a ring structure having up to 6 carbon atoms; and Vi is a vinylic radical having from 2 to 30 carbon atoms in the radicals and having the following structural formula (3b)

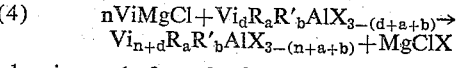

wherein no more than 2 valence bonds indicated by the dotted lines in the above formula are bonded to the $C_2$ atom, and no more than 1 valence bond indicated by the dotted line in said formula is bonded to the $C_1$ atom, wherein $R^2$, $R^3$ and $R^4$ are monovalent hydrocarbon groups having up to 28 carbon atoms, and $R^5$ is a divalent saturated aliphatic hydrocarbon radical having up to 8 carbon atoms in the chain, and $a$, $b$, $c$, and $d$ are whole numbers from zero to 1, wherein the sum of $a+b+c+d$ is a whole number from 2 to 3, and wherein when $b$ equals zero the sum of $a+c+d$ equals 3, and wherein when $b$ equals one of the sum of $a+b+c+d$ equals 2, and wherein when any of the subscripts $a$, $c$ and $d$ are zero a hydrogen replaces the corresponding radical in the formula.

The process for producing the novel vinylic compounds comprises reacting a vinylicmagnesium chloride with a compound selected from the class consisting of organoaluminum halides, aluminum trihalides, aluminum alkoxides and aluminum aryloxides to produce vinyl-containing aluminum compounds in accordance with the following equation:

(4) $\qquad nViMgCl + Vi_d R_a R'_b AlX_{3-(d+a+b)} \rightarrow$
$\qquad\qquad Vi_{n+d} R_a R'_b AlX_{3-(n+a+b)} + MgClX$ wherein $n=1$, 2 or 3; $d=0$, 1 or 2; $a$ and $b=0$ or 1; $d+a+b$ may not be greater than 2; $n+a+b$ may not be greater than 3; Vi and X have the same significance ascribed to them above; R and R' are the same or different and have the same meaning given to them above. The following type compounds are the products included within the general formula for the vinylicaluminum product above: $Vi_3Al$, $Vi_2RAl$, $Vi_2AlX$, $ViRR'Al$, $ViRAlX$, $ViAlX_2$. As illustrated in the foregoing Equation 4, the organoaluminum reactant may contain one or two vinylic groups bonded to the aluminum atom. If so, said reactant was also made in accordance with the present process.

An aspect of the present process is illustrated in the following equation:

(5) $\qquad nViMgCl + R_a R'_b AlX_{3-(a+b)} \rightarrow Vi_n R_a R'_b AlX_{3-(n+a+b)}$
$\qquad\qquad + nMgClX$ wherein $n=1$, 2 or 3; $a$ and $b=0$ or 1; the sum of $n+a+b$ being not greater than 3; the sum of $a+b$ may not be greater than 2; Vi and X have the same significance ascribed to them above; and R and R' are the same or different and have the same meaning ascribed to them above. The process may be so controlled that any of the aforementioned products or a mixture of products may be produced. It is also possible to carry out the reaction stepwise by first reacting a vinylicmagnesium chloride with an organoaluminum reactant defined above not containing vinylic radicals or with an aluminum trihalide, alkoxide or aryloxide, and then further reacting the product of this reaction with a vinylicmagnesium chloride as is included in Equation 4 herein.

The novel vinylic aluminum compounds may also be prepared by reacting a vinylic aluminum halide, alkoxide or aryloxid econtaining at least one vinylic group bonded to the aluminum atom with an organomagnesium halide (preferably the chloride). Thus, diphenyl-vinylaluminum may be produced by reacting vinylaluminum dichloride with phenylmagnesium chloride. Of course, the vinylaluminum compounds utilized as a reactant is produced by the process of this invention, as illustrated in Equation 4. The use of this two-step procedure is advantageous in certain cases where it will result in mixtures of reaction products and reactants which are more easily separated than would be mixtures resulting from the one step process illustrated in Equation 4.

When the vinylicmagnesium chloride is reacted with an aluminum reactant, the product may be any of the type compounds listed herein before (as products) or any mixture of them, dependent upon the reactants used, the relative proportions of the reactants used, and the process conditions. The reaction product will usually be a mixture of 2 or 3 of the above products. However, by control of the variables, it is possible to produce a product containing a preponderance of a desired reaction product. A single product may be obtained when using a mono-halogen, monalkoxy or monoaryloxy aluminum compound as reactant or a sufficient excess of ViMgCl with $AlX_3$, $RAlX_2$, $R_2AlX$ to give $Vi_3Al$, $Vi_2RAl$ and $ViR_2Al$, respectively.

The process is usually carried out by dissolving the aluminum containing reactant in an organic solvent. Vinylic magnesium chloride (usually in a solution of cyclic ether, Q, more particularly hereinafter defined) is added to the solution of an aluminum reactant preferably with agitation. A reaction will usually start immediately. If all of the halogen, alkoxy or aryloxy is to be replaced, the organoaluminum halide, aluminum halide, aluminum alkoxide or aluminum aryloxide may be added to the vinylicmagnesium chloride solution. The reaction temperature will vary with the reactants and solvents utilized and the products desired and will usually be between room temperature and the reflux temperature of the reaction mixture. The reaction is usually exothermic. For special conditions, it may be necessary to carry the reaction out, at low temperatures or under reduced pressures. The reaction is preferably carried out in an inert atmosphere, usually nitrogen. The reaction products include one or more of the vinylic aluminum compounds and a magnesium halide salt cake which may be separated by conventional means, e.g., filtration, crystallization, etc. The solvents are usually removed by distillation. When the products include more than one vinylic aluminum compound, they may be separated by conventional separatory techniques.

The vinylic magnesium chlorides are prepared as disclosed in U.S. Patent application No. 549,517, now abandoned.

Compound Q referred to above is a substituted or unsubstituted non-aromatic heterocyclic oxygen compound having from 5 to 6 atoms in the heterocyclic ring, and only one oxygen in said heterocyclic ring. The other ring atoms of said heterocyclic ring are carbon with the exception that a substituted ring nitrogen, substituted preferably with an alkyl radical, having up to 6 carbon atoms in the alkyl chain, may replace a carbon atom in said heterocyclic ring which is not adjacent to said oxygen atom in the ring. A further requirement for compound Q is that said heterocyclic ring is of a non-aromatic character, that is, that it does not contain a cyclic conjugated system of bonding within the heterocyclic ring. Preferably, said compound Q contains not more than one unsaturation between carbon atoms of said heterocyclic ring, which is an ethylenic unsaturation. A further requirement for compound Q is that it be unsubstituted, except for hydrogen at at least one carbon atom which is adjacent said oxygen atom in said heterocyclic ring. The heterocyclic ring of compound Q may carry any substituents which are not reactive with the reactants and the reaction products, under the conditions of reaction, for the preparation of the vinylicmagnesium chloride. By way of illustration the following substituents may be mentioned: alkyl, aryl, alkoxy, aryloxy; —$CH_2OR''$ wherein $R''$ is alkyl, preferably having up to 6 carbon atoms or —$(CH_2$—$CH_2$—$O)_xR'''$ wherein $x$ is a whole number from 1 to 8 and $R'''$ is alkyl, preferably having up to 6 carbon atoms:

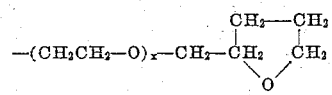

wherein $x$ is a whole number from 1 to 8; and

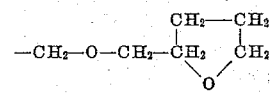

In a preferred form of this invention the substituents on said compound Q, aside from hydrogen, occur only at the number 2 position of said non-aromatic heterocyclic ring system and do not contain more than 75 atoms in the group.

Q may function as a solvent in this present process. If it is used as a solvent, a high melting point (e.g., about 90° C.) will cause difficulty in carrying out the reaction. For this reason it is advantageous to use a liquid Q, i.e., liquid below 90° C.

It will be noted from the above that an essential feature of the compound Q is that it be non-aromatic in character. Another essential feature of compound Q is that it be free of substituents except for hydrogen, at at least one carbon atom which is adjacent the oxygen atom of the heterocyclic ring. These features are essential in order to make the free p-electrons on said oxygen atom available for coordination and complex formation with magnesium. The presence of substituents, aside from hydrogen, on both carbon atoms adjacent the oxygen atom of said heterocyclic ring restricts the availability of the free p-electrons of said oxygen for donation and complex formation, whereas a substituent on only one of said carbon atoms does not. The presence of substituents in other positions on the heterocyclic ring does not affect the availability of electrons on said oxygen for coordination and complex formation. The free p-electrons on oxygen atoms which constitute part of a heterocyclic ring system possessing aromatic characteristics are also not available for coordination and complex formation. The "aromaticity" of certain heterocyclic compounds is a well known phenomena. This phenomena is associated with the cyclic conjugated system of bonding which is characteristic of these heterocyclic compounds. Thus, furan, which is known to be aromatic in character, is not operative as a compound Q, whereas dihydropyran, which contains a single unsaturated bond is operative as a compound Q for the purposes of this invention. This is explained on the basis of the resonance of the respective compounds. Furan exhibits a p-pi aromatic resonance as a result of which the electron distribution is such that the free p-electrons of the oxygen atom are not available for coordination and complex formation. Dihydropyran, on the other hand exhibits only an ethylenic p-pi resonance in which the free p-electrons are still available for coordination and complex formation thus rendering it operative for the present purpose.

By way of illustration heterocyclic oxygen compounds included within the definition of compound Q are as follows: tetrahydrofuran, tetrahydropyran, 2-methyltetrahydrofuran, tetrahydrofurfuryl ethyl ether, dihydropyran, N-methylmorpholine, ditetrahydrofurfuryl ether and ethers of general formula

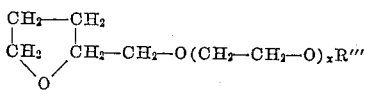

wherein R''' is an alkyl group having from 1 to 6 carbon atoms in the alkyl radical or the group

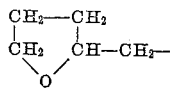

and $x$ is a whole number from 1 to 8.

In a preferred form of this invention the vinylicmagnesium chloride is employed in the form of a solution in compound Q. This is preferred since this reagent may be readily and economically prepared by the reaction of the vinylic chloride with magnesium in the presence of compound Q. The solutions thus prepared may be used as a reactant in the present process. However, the vinylicmagnesium chloride may also be used in the process of the present invention when dissolved in other inert solvents, e.g., ethylene polyethers, heptane, cyclohexane, toluene, etc. These solutions are prepared by the displacement of compound Q from solutions of the vinylic magnesium chlorides—compound Q solutions by the above mentioned inert solvents. The vinylic magnesium chloride may also be used in accordance with this invention in the form of a solution in a mixture of compound Q and an inert solvent mentioned supra.

The solvents utilized in the process must be inert to other components of the reaction mixture under the process conditions and are preferably organic solvents that distill below 150° C. The preferred solvents include substituted and unsubstituted tetrahydrofuran, tetrahydropyran, heptane, hexane, pentane, cyclohexane, octane, isooctane, cumene, xylene, toluene, benzene, etc. As noted above, a solvent system containing more than one component may also be used. A preferred solvent system is that containing tetrahydrofuran and a hydrocarbon solvent, e.g., saturated aliphatic, saturated cyclic aliphatic or aromatic solvent. Almost all of the reaction mixtures utilized will contain tetrahydrofuran or an equivalent material, designated as compound Q, complexed with the vinylicmagnesium chloride.

The following examples illustrate ways in which the principle of the invention can be employed, but they are not to be construed as limiting the invention.

*Example No. 1.—Vinylaluminum dichloride*

ViAlCl$_2$

A separately prepared solution of 1 mole of vinylmagnesium chloride in tetrahydrofuran is added, portionwise, to one mole of solid aluminum chloride. The addition is made at such a rate as to keep the reaction mixture refluxing. When the addition is complete, the reaction is refluxed further for 2 hours and permitted to stand overnight. Ligroine (B.P. 35°–60° C.) is added to the resulting mixture to facilitate the filtering of the insoluble magnesium chloride. The filtered cake is then washed with more ligroine (35°–60° C.). The tetrahydrofuran and the hydrocarbon solvents are removed and the pure product is obtained by vacuum fractional distillation.

*Example No. 2.—Divinylaluminum chloride*

$(CH_2=CH)_2AlCl$

A solution of 2 moles of vinylmagnesium chloride in tetrahydrofuran is added to a slurry of 1 mole of aluminum chloride in ligroine (B.P. 35°–60° C.), portionwise, at such a rate to maintain reflux without the application of heat. The addition time takes approximately ¾ of an hour. After the addition, refluxing is continued for 2 hours and the reaction mixture permitted to sit overnight. Additional ligroine (B.P. 35°–60° C.) is added to facilitate the filtering off of the magnesium chloride. The solvents are stripped off and the residue is distilled under high vacuum to yield divinylaluminum chloride.

*Example No. 3.—Vinylaluminum dibromide*

$(CH_2=CH)AlBr_2$

One mole of separately synthesized vinylmagnesium chloride in tetrahydropyran is added to a slurry of one mole of aluminum bromide in pentane at such a rate that the reaction mixture is kept at reflux. After the addition is complete (approximately 20 minutes), refluxing is continued by the application of heat for an additional hour and a half. The reaction mixture is cooled and ligroine (B.P. 35°–60° C.) is added and the salts isolated by filtration. The mother liquor is stripped of solvent and vinylaluminum dibromide is isolated by distillation under high vacuum.

*Example No. 4.—Divinylaluminum bromide*

$(CH_2=CH)_2AlBr$

Divinylaluminum bromide is formed, following the procedure described in Example No. 3, except that a ratio of 2 moles of vinylmagnesium chloride to 1 mole of aluminum bromide is used.

*Example No. 5.—Vinylaluminum dimethoxide*

$(CH_2=CH)Al(OCH_3)_2$

A solution of 1 mole of vinylmagnesium chloride in tetrahydrofurfuryl ethyl ether is added to a solution containing 1 mole of aluminum trimethoxide in tetrahydrofuran. Sufficient heat is applied during the addition to maintain the reaction mixture at reflux and refluxing is continued for 2½ hours after the addition is complete. The reaction mixture is permitted to cool to room temperature, ligroine (B.P. 35°–60° C.) is added, and the salt which deposits collected by filtration. Vinylaluminum dimethoxide is isolated by removal of the solvents followed by vacuum fractional distillation.

*Example No. 6.—Divinylaluminum methoxide*

$(CH_2=CH)_2Al(OCH_3)$

Following the procedure in Example No. 5, divinylaluminum methoxide is prepared using two moles of vinylmagnesium chloride and 1 mole of aluminum trimethoxide in tetrahydrofurfuryl ethyl ether.

*Example No. 7.—Vinylaluminum diisopropoxide*

$(CH_2=CH)Al[OisoC_3H_7]_2$

To one mole of aluminum triisopropoxide dissolved in dihydropyran is added a solution of one mole of vinylmagnesium chloride in tetrahydrofuran with enough heat being supplied to maintain the reaction mixture at reflux. Refluxing is continued after the addition is over for 2 hours. The reaction mixture is permitted to cool to room temperature, ligroine (B.P. 35°–60° C.) is added and the salt collected by filtration. The mother liquor is stripped of solvents and the product purified by vacuum distillation.

*Example No. 8.—Divinylaluminum isopropoxide*

$(CH_2=CH)_2Al(OisoC_3H_7)$

This product is formed from 2 moles of vinylmagnesium chloride and 1 mole of aluminum triisopropoxide, following the procedure described in Example No. 7.

*Example No. 9.—Vinylaluminum diphenoxide*

$(CH_2=CH)Al(OC_6H_5)_2$

A solution containing 1 mole of vinylmagnesium chloride in 2-methyltetrahydrofuran is added to 1 mole of aluminum triphenoxide in 2-methyltetrahydrofuran. Heating is supplied during the addition so as to maintain the reaction at reflux, and refluxing continued for an additional 12 hours. A quantity of ligroine (B.P. 35°–60° C.) is added and the resulting salt is isolated by filtration. The liquors are collected, solvents removed, and the product isolated by distillation under vacuum.

*Example No. 10.—Vinyldimethylaluminum*

$$(CH_2=CH)Al(CH_3)_2$$

To 1 mole of vinylaluminum dichloride as prepared in Example No. 1 in tetrahydrofuran is added 2 moles of a solution of methylmagnesium chloride prepared in tetrahydrofuran, at such a rate that reflux is maintained spontaneously. After the addition, the reaction mixture is refluxed a further 10 minutes, cooled to room temperature, pentane is added, and the flask permitted to sit overnight. The next day the salt which deposits is removed by filtration and the solvents stripped off. Vinyldimethylaluminum is isolated by vacuum distillation.

*Example No. 11.—Divinylmethylaluminum*

$$(CH_2=CH)_2CH_3Al$$

To a solution of 1 mole of divinylaluminum bromide in dihydropyran is added 1 mole of a separately prepared solution of methylmagnesium chloride in dihydropyran, with just enough heat being supplied to maintain reflux during the entire addition. When the addition is complete, further reflux is maintained for a period of 2 hours. The material is permitted to cool to room temperature, and ligroine (B.P. 65°–75° C.) is added to assist in the removal of the formed salts. After standing overnight, the salt is isolated by filtration, washed with some more ligroine (B.P. 65°–75° C.), and the liquors collected. After stripping the solvent, the product is isolated by vacuum distillation.

*Example No. 12.—Vinyldiisopropylaluminum*

$$(CH_2=CH)Al(isoC_3H_7)_2$$

To a solution containing 1 mole of vinylaluminum diisopropoxide in dihydropyran (as prepared in Example No. 7) is added 2 moles of separately synthesized isopropylmagnesium chloride in dihydropyran. The rate of addition is controlled so that refluxing is maintained. After the addition is over, refluxing is continued by the application of external heat for a period of 2½ hours. A large quantity of ligroine (B.P. 35°–60° C.) is added to the cooled reaction mixture and the salt which forms is isolated by filtration. The solvents are removed from the mother liquor and the product isolated by vacuum distillation.

*Example No. 13.—Divinylisopropylaluminum*

$$(CH_2=CH)_2Al(isoC_3H_7)$$

To a solution of 1 mole of divinylaluminum chloride (as prepared in Example No. 2) in tetrahydropyran is added, portionwise, a solution of the calculated amount of separately prepared isopropylmagnesium chloride in tetrahydropyran with heat being supplied to maintain reflux during the entire addition and for a period of 2 hours thereafter. After cooling the reaction mixture to room temperature, pentane is added and the resulting salt isolated. The solvents are removed and the products obtained in a purified form by vacuum distillation.

*Example 14.—Trivinylaluminum*

$$(CH_2=CH)_3Al$$

To a solution of 3 moles of separately prepared vinylmagnesium chloride in tetrahydrofuran is added at reflux temperature solid aluminum chloride, portionwise, over a period of 30 minutes so that reflux continues spontaneously. After the addition, the reaction mixture is maintained at reflux by heating for a further 2 hours and then permitted to sit overnight. The next day ligroine (B.P. 35°–60° C.) is added to facilitate the filtration of the resulting magnesium chloride salt. After the salt is filtered off the solvents are removed and the product is obtained in a pure form by fractional distillation under high vacuum.

*Example No. 15.—Vinyldiphenylaluminum*

$$(CH_2=CH)(C_6H_5)_2Al$$

To a solution containing 1 mole of vinylaluminum diphenoxide (as prepared in Example No. 9) in 2-methyltetrahydrofuran is added a solution containing 2 moles of separately prepared phenylmagnesium chloride in tetrahydrofuran. Throughout the addition, which takes approximately 50 minutes, heating is supplied to maintain the reaction mixture at reflux and the heating is then continued for a further period of 3 hours. The reaction mixture is cooled to room temperature and ligroine (B.P 35°–60° C.) is added to assist in the isolation of the resulting salt. After removal of the salt by filtration, the solvents are evaporated under vacuum and the purified product isolated by distillation under high vacuum.

*Example No. 16.—Divinylpentachlorophenylaluminum*

$$(CH_2=CH)_2(Cl_5C_6)Al$$

To a solution of 1 mole of divinylaluminum bromide (prepared as in Example No. 4, except that dihydropyran was used as a solvent) is added a separately prepared solution of 1 mole of pentachlorophenylmagnesium chloride in tetrahydrofuran, dropwise, at such a rate that spontaneous refluxing is maintained. The reaction mixture is refluxed after the addition for about 16 hours, and is then cooled. Pentane is added to assist in the separation of the residual salts. Distillation of the solvents is followed by fractional distillation of the residue to provide divinylpentachlorophenylaluminum.

*Example No. 17.—Tri-1-butenylaluminum*

The product is prepared following the procedure described in Example No. 14 for the preparation of trivinylaluminum, replacing the vinylmagnesium bromide by the Grignard fromed from 1-chloro-1-butene.

*Example No. 18.—Divinylaluminum phenoxide*

$$(CH_2=CH)_2Al(OC_6H_5)$$

Two moles of vinylmagnesium chloride, prepared in 2-methyl-tetrahydrofuran, is added to a solution of aluminum triphenoxide in 2-methyltetrahydrofuran at such a rate that reflux is spontaneously maintained. When the addition is over, heat is applied and the matter refluxed further for 20 hours. Upon cooling, the salt which deposits is collected with the addition of ligroine (B.P. 35°–60° C.). Distillation of the solvents and vacuum distillation of the product affords pure divinylaluminum phenoxide.

*Example No. 19.—Divinylphenylaluminum*

$$(CH_2=CH)_2(C_6H_5)Al$$

One mole of phenylmagnesium chloride is prepared in tetrahydropyran. This Grignard solution is then added, dropwise, to a solution of divinylaluminum phenoxide prepared in a manner analogous to that shown in Example 18 (except that tetrahydropyran is used as a solvent). The addition is maintained at such a rate that refluxing continues spontaneously. After a 20 hour period of further reflux, the reaction mixture is cooled to room temperature and the salt that is formed is conveniently isolated with the addition of ligroine (B.P. 35°–60° C.). Distillation affords the pure product.

*Example No. 20.—Dicyclohexenylaluminum isopropoxide*

$$(C_6H_9)_2Al(OisoC_3H_7)$$

Two moles of separately prepared 1-cyclohexen-1-ylmagnesium chloride in 2-methyltetrahydrofuran is added, dropwise, to a solution of 1 mole of aluminum triisopropoxide in 2-methyltetrahydrofuran over a period of 50 minutes at such a rate that gentle reflux is maintained throughout the addition. The suspension is refluxed for a further period of 4 hours and cooled to room temperature. Pentane is added to the cooled mixture to assist in the isolation of the suspended salts. The mother liquors are combined and the solvents evaporated. The product is isolated by distillation under high vacuum.

*Example No. 21.—Dicyclohexenyloctylaluminum*

$$(C_6H_9)_2(C_8H_{17})Al$$

n-Octylmagnesium chloride is separately prepared in tetrahydrofuran. One mole of this solution is added to 1 mole of dicyclohexenylaluminum isopropoxide in 2-methyltetrahydrofuran (as prepared in Example No. 20). The rate of addition of the Grignard is regulated so as to maintain reflux without the application of the heat. After the addition is completed refluxing is continued for a period of 27 hours, at which time the reaction mixture is cooled and normal pentane is introduced to assist in the removal of salts. After filtering, the solvents are evaporated under vacuum, and the purified material is obtained by high vacuum distillation.

*Example No. 22.—Vinyldiethylaluminum*

$$(CH_2=CH)(C_2H_5)_2Al$$

Vinyldiethylaluminum is prepared following the procedure shown in Example No. 10 for vinyldimethylaluminum, making use here of 1 mole of vinylaluminum dichloride and 2 moles of ethylmagnesium chloride.

*Example No. 23.—Divinylaluminum*

$$(CH_2=CH)_2(C_2H_5)Al$$

To a solution containing 1 mole of divinylaluminum isopropoxide (as prepared in Example 8, however, using tetrahydrofuran as a solvent) is added 1 mole of separately prepared ethylmagnesium chloride in tetrahydrofuran, dropwise, and at such a rate that the heat which evolves is sufficient to sustain refluxing. Heat is applied after the addition is complete to reflux the reaction mixture for a further period of 16 hours. The salts which form are collected with the aid of pentane. The liquids are collected and freed of solvent by evaporation and the purified product obtained by distillation in vacuo.

*Example No. 24.—Divinyl-α-styrylaluminum*

$$(CH_2=CH)_2(\alpha-C_8H_7)Al$$

Following the procedure in Example No. 2, one mole of divinylaluminum chloride is prepared in tetrahydrofuran. To this solution is added, dropwise, 1 mole of the Grignard reagent prepared from α-chlorostyrene. The rate of addition is regulated so that reflux is maintained as a result of the evolution of heat from the reaction. When the addition is complete refluxing is continued for a period of 12 hours and the salts which deposit are isolated with the aid of pentane. Distillation of the solvents followed by vacuum distillation of the residue provides the pure product.

*Example No. 25.—Divinyl-p-vinylphenylaluminum*

$$(CH_2=CH)_2(4-CH_2=CH-C_6H_4)-Al$$

The Grignard reagent from p-chlorostyrene is prepared in tetrahydrofuran. To one mole of this reagent is added, portionwise, 1 mole of divinylaluminum chloride (whose preparation is shown in Example No. 2). The rate of addition is such as to maintain gentle reflux and reflux is continued for a period of 12 hours after the addition is complete. Upon cooling, the salts which deposit are collected with the aid of pentane. The solvents are evaporated under vacuum which is followed by distillation under reduced pressure to provide the purified product.

*Example No. 26.—Vinylanisylaluminum chloride*

$$(CH_2=CH)(CH_3OC_6H_4)AlCl$$

A solution containing 1 mole of the Grignard reagent from p-anisylchloride in tetrahydrofuran is prepared. This solution is added 1 mole of vinylaluminum dichloride, as prepared in Example No. 1. The addition is done rather rapidly and vigorous refluxing ensues. Refluxing is continued by the application of external heat for a further period of 6 hours. At this time the reaction mixture is cooled to room temperature, pentane is added and the salts which separate out are collected. The mother liquor is concentrated down by evaporation and the purified material obtained by vacuum distillation. The product is accompanied by the formation of some vinyldianisylaluminum.

*Example No. 27.—Vinyl-di-4-biphenylylaluminum*

$$(CH_2=CH)(C_6H_5C_6H_4)_2Al$$

Two moles of the Grignard reagent prepared from 4-biphenylylchloride in tetrahydrofuran is separately prepared and allowed to slowly drip into a solution of vinylaluminum dichloride in tetrahydrofuran (as prepared in Example No. 1). The mixture is maintained at reflux during the addition and heating is continued for 20 hours afterwards. The salts which are formed and collected are washed with pentane solvent. The combined washings and the mother liquor are stripped of solvents under vacuum and the products isolated by distillation under high vacuum.

*Example No. 28.—Vinylbenzylaluminum chloride*

$$(CH_2=CH)(C_6H_5CH_2)AlCl$$

The requisite amount of the Grignard formed from benzylchloride in tetrahydropyran is added slowly, so as to maintain reflux, to a solution containing 1 mole of vinylaluminum dichloride (prepared as in Example No. 1, except using tetrahydropyran as a solvent). After the addition, heat is supplied to continue the reflux for a further period of 7 hours and the mixture is permitted to cool to room temperature. The precipitated salts are removed with the aid of pentane and after the solvents are evaporated under vacuum the product is obtained in a pure form by vacuum distillation.

*Example No. 29.—Vinyl-di-α-naphthylaluminum*

$$(CH_2=CH)(\alpha-C_{10}H_7)_2Al$$

Separately, two moles of α-naphthylchloride is converted to the Grignard in tetrahydrofuran solution. To this is added 1 mole of vinylaluminum diphenoxide (as prepared in Example No. 9, except that the solvent utilized here is tetrahydrofuran). The addition is regulated to maintain reflux throughout and heat is supplied when necessary. When the addition is over, refluxing is continued for a further period of 10 hours. The mixture is decanted from the salts which deposit, and the salts are washed with pentane. Some more pentane is added to the decanted layer and a further quantity of salt precipitates. This too is isolated by filtration. The combined filtrates are distilled leaving a residue which is recrystallized from a mixture of benzene and xylene (50:50).

*Example No. 30.—Divinylbenzylaluminum*

$$(CH_2=CH)_2(C_6H_5CH_2)Al$$

To a crude solution containing 1 mole of vinylbenzylaluminum chloride in tetrahydropyran (as prepared in Example No. 28), in which just the salt has been filtered off but the product not distilled, is added 1 mole of vinylmagnesium chloride, prepared in tetrahydropyran, at a rate just sufficient to maintain spontaneous reflux. Upon completion of the addition, reflux is continued for a period of 17 hours. The mixture is cooled to room temperature, and then diluted with pentane. The salts which fall out are removed and the solvents evaporated under vacuum. The residual oil which forms is distilled under high vacuum to yield the pure product.

*Example No. 31.—Vinyldidodecylaluminum*

$$[CH_2=CH][CH_3(CH_2)_{11}]_2Al$$

To a solution of vinylaluminum dichloride in tetrahydrofuran (1 mole) as prepared in Example 1 is added slightly more than 2 moles of the Grignard prepared from 1-chlorododecane in tetrahydrofuran. Heat must be supplied throughout the addition to achieve a refluxing temperature. Further refluxing is continued for a period of 34 hours. The salts which separate out are filtered with the aid of pentane. The salts were washed thoroughly by grinding in a mortar and pestle with additional amounts of normal pentane. All the liquids are combined and the solvents are removed by evaporation in vacuo. A gummy residue which slowly crystallizes is obtained. Distillation in a molecular still affords the purified product.

*Exampe 32.—Tri-isopropenylaluminum*

$$CH_2=C(CH_3)]_3Al$$

Aluminum chloride, anhydrous (0.33 mole) dispersed in heptane is added slowly to a stirred solution of 2-propene-2-ylmagnesium chloride in tetrahydrofuran. The mixture is cooled during the addition and then is slowly raised to reflux, refluxed for 3 or 4 hours, cooled and filtered by use of a filter stick to yield a solution of tris 2-propene-2-ylaluminum. Removal of solvent by distillation yields crystalline material.

*Example No. 33.—Propenylaluminum dichloride*

$$(CH_3CH=CH)AlCl_2$$

This product is made by the procedure shown for the preparation of vinylaluminum dichloride shown in Example No. 1, making use, however, of the Grignard reagent prepared from the corresponding propenyl chloride.

*Example No. 34.—Propenyl-di-n-butylaluminum*

$$(CH_3CH=CH)(n-C_4H_9)_2Al$$

To 1 mole of propenylaluminum dichloride, prepared as in Example No. 33, dissolved in tetrahydrofuran, is added a slight excess of more than 2 moles of the Grignard prepared from n-butyl chloride in tetrahydrofuran with vigorous stirring. No external heating is required since reaction is exothermic. However, when the addition is complete, heat is applied to continue the refluxing for a period of 12 hours. The finely divided salt which appears is collected with the aid of pentane solvent. The liquors are combined and the solvents removed by distillation. The product is obtained by careful vacuum distillation of the resulting residue.

*Example No. 35.—Vinylcyclohexenylanisylaluminum*

$$(CH_2=CH)(C_6H_9)(CH_3OC_6H_4)Al$$

Into a flask containing 1 mole of vinylanisylaluminum chloride in tetrahydrofuran (prepared as in Example No. 26) is added, dropwise, 1 mole of 1-cyclohexen-1-ylmagnesium chloride prepared in tetrahydrofuran. Only a sufficient amount of heat is supplied to the mixture as is necessary to maintain reflux throughout the entire addition time and for a period of 10 hours thereafter. Upon cooling, the salt which forms can be successfully collected with the aid of pentane. The liquid layers are combined and the solvents removed under reduced pressure. The residual product is purified by distilltion under high vacuum.

*Example No. 36.—Divinylallylaluminum*

$$(CH_2=CH)_2(CH_2=CHCH_2)Al$$

A solution containing 1 mole of divinylaluminum methoxide (prepared as in Example 6, but using tetrahydrofuran as a solvent) is added very slowly to a solution of 1 mole of the Grignard prepared from allyl chloride in tetrahydrofuran. After the addition, refluxing is continued for 6 hours and the reaction mixture is kept overnight. The solids which form are filtered off and the solvents removed from the combined liquids. The residue slowly crystallized on standing and is conveniently purified by distillation in a molecular still.

*Example No. 37.—Divinylbenzylaluminum*

$$(CH_2=CH)_2(C_6H_5CH_2)Al$$

Divinylbenzylaluminum is made in the manner described for the preparation of divinylallylaluminum in Example No. 36, however, the Grignard prepared from benzyl chloride is substituted for that of allyl chloride in the reaction.

*Example No. 38.—Vinyldibenzylaluminum*

$$(CH_2=CH)(C_6H_5CH_2)_2Al$$

Exactly 1 mole of vinylaluminum dichloride dissolved in tetrahydrofuran, as prepared in Example 1, is treated with 2 moles of the Grignard fashioned from benzyl chloride in tetrahydrofuran. The resultant mixture is refluxed for 8 hours. After isolation of the salt which forms and removal of the solvents, the product is obtained by high vacuum distillation.

*Example No. 39.—Divinylhexylaluminum*

$$(CH_2=CH)_2(n-C_6H_{13})Al$$

Divinylaluminum chloride (1 mole), as prepared in Example No. 2, is added to the Grignard formed from 1-chlorohexane in tetrahydrofuran solution and the resultant mixture heated to reflux for 12 hours. Upon cooling, the solids which separate are removed with the aid of normal pentane. The combined liquors are freed of solvents and the final distillation produces the purified product.

*Example No. 40.—Divinylcyclohexylaluminum*

$$(CH_2=CH)_2(C_6H_{11})Al$$

Divinylcyclohexylaluminum is prepared following the procedure shown in Example No. 39, making use of chlorocyclohexane instead of 1-chlorohexane.

*Example No. 41.—Divinylphenethylaluminum*

$$[CH_2=CH]_2(C_6H_5CH_2CH_2)Al$$

The procedure shown in Example No. 39 is followed for the preparation of divinylphenethylaluminum, use being made here of the Grignard formed from 2-chloroethylbenzene.

Throughout the application the vinylicmagnesium chlorides have been designated as such. When the magnesium chloride compounds are prepared in the presence of compound Q, defined herein, the vinylicmagnesium chloride compounds may take the form of a complex with compound Q, ViMgCl.nQ, wherein Vi and Q are as defined above and $n$ is a small indeterminate whole number in the order of 1, 2 or 3.

The vinylicaluminum compounds of this invention are polyfunctional in character and are active cross-linking agents. They may be polymerized with such compounds as styrene, vinyl acetate, vinyl chloride, acrylates, esters, acrylics and other vinylated metals such as vinyltins, vinylborons, vinylsilanes, vinylarsenics, and vinyl antimony to yield polymers having a high metal content which may be used in the plastic fabricating industries as well as other industries. They are also useful as additives to petroleum products.

While the invention has been described with reference to various examples and embodiments, it will be apparent to those skilled in the art that various modifications may be made, and equivalents substituted therefor, without departing from the principles and true nature of the invention.

What is claimed is:
1. Trivinylaluminum.
2. Triisopropenylaluminum.
3. Tri-1-butenylaluminum.
4. A vinylic aluminum compound having the general formula

$$(Vi)_n(R)_aAlX_{3-(n+a)}$$

wherein R is a hydrocarbon radical, X is a radical selected from the class consisting of halogen, alkoxy and aryloxy radicals, n is an integer from 1 to 3, a is a whole number from 0 to 2 and (n+a) is not greater than 3, and Vi is a vinylic radical having up to eight carbon atoms and bonded to aluminum through an ethylenically unsaturated carbon atom and having the general formula

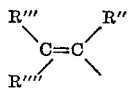

wherein R'', R''' and R'''' are selected from the class consisting of hydrogen atoms and hydrocarbon radicals.
5. A compound according to claim 4 wherein R has up to 18 carbon atoms and a is an integer from 1 to 2.
6. A compound according to claim 4 wherein n is 3.
7. A vinylic aluminum compound having the general formula

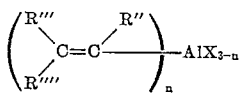

wherein R'', R''' and R'''' are selected from the class consisting of hydrogen atoms and hydrocarbon radicals having a total of up to six carbon atoms, X is a radical selected from the class consisting of halogen, alkoxy and aryloxy radicals and n is an integer from 1 to 3.
8. A composition according to claim 7 wherein R'', R''', and R'''' are hydrogen atoms.
9. Vinylaluminum dichloride.
10. Divinylaluminum chloride.
11. A process for preparing vinylicaluminum compounds which comprises reacting an aluminum compound having the general formula $R_aAlX_{3-a}$, wherein R is a hydrocarbon radical, X is a radical selected from the class consisting of halogen, alkoxy and aryloxy radicals, and a is a whole number from 0 to 2; with at least a molar equivalent of a vinylicmagnesium chloride having the general formula

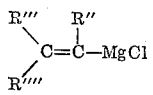

wherein R'', R''' and R'''' are selected from the class consisting of hydrogen atoms and hydrocarbon radicals; said reaction being carried out in the presence of a cyclic ether selected from the class consisting of tetrahydrofurans, tetrahydropyrans, dihydropyrans, tetrahydrofurfuryl ethyl ethers, and N-methylmorpholines, the molar amount of the cyclic ether being at least equal to the molar amount of vinylicmagnesium chloride.
12. A process according to claim 11 wherein the aluminum compound is aluminum trichloride.
13. A process according to claim 12 wherein the vinylic magnesium chloride is vinylmagnesium chloride.
14. A process according to claim 13 wherein the cyclic ether is tetrahydrofuran.
15. A process for preparing trivinylaluminum which comprises reacting at least three molar equivalents of vinyl-magnesium chloride in at least an equimolar amount of tetrahydrofuran with one molar equivalent of aluminum trichloride.

References Cited in the file of this patent

UNITED STATES PATENTS

| | | |
|---|---|---|
| 2,786,860 | Ziegler et al. | Mar. 26, 1957 |
| 2,826,598 | Ziegler et al. | Mar. 11, 1958 |

OTHER REFERENCES

Chemical Abstracts—vol. 41 (1947) col. 3741.

Comptes Rendus de l'Acadamie des Science, vol. 239 (1954), pp. 1303 to 1305.

Kharasch et al.: "Grignard Reactions of Nonmetallic Substances" (1954), pp. 24 and 50 (Prentice Hall, Inc., N.Y.).

"European Scientific Notes"—vol. 6, No. 13 (July 1, 1952), p. 178 (published by Office of Naval Research, London).